L. BOIRAULT.
PIPE COUPLING DEVICE FOR RAILWAY AND TRAM CARS.
APPLICATION FILED JULY 21, 1914.

1,127,170.

Patented Feb. 2, 1915.

WITNESSES:
Chas. H. Leibman
A. D. Rollhaus

INVENTOR
Louis Boirault
BY Munn & Co
ATTORNEYS

THE NORRIS PETERS CO., PHOTO-LITHO., WASHINGTON, D. C.

UNITED STATES PATENT OFFICE.

LOUIS BOIRAULT, OF PARIS, FRANCE.

PIPE-COUPLING DEVICE FOR RAILWAY AND TRAM CARS.

1,127,170.  Specification of Letters Patent.  Patented Feb. 2, 1915.

Original application filed October 31, 1912, Serial No. 728,958. Divided and this application filed July 21, 1914. Serial No. 852,195.

*To all whom it may concern:*

Be it known that I, LOUIS BOIRAULT, a citizen of the Republic of France, residing at 58 Rue Taitbout, Paris, Republic of France, engineer, have invented certain new and useful Improvements in Pipe-Coupling Devices for Railway and Tram Cars, of which the following is a specification.

The present application is a division of my pending application, filed October 31, 1912, Serial No. 728,958.

This invention relates to pipe coupling devices for railway and tram cars and has for its object to so construct a device of this character that it will permit of air, steam, gas and other similar fluid pipes being brought into operative engagement with each other by simply coupling the cars together. The said device is secured on the coupling apparatus of the car, so that when the two cars are automatically coupled, the pipe coupling devices are brought to bear on one another. The automatic car coupling apparatus may be of any suitable system if only provided with guiding members to insure the register of the pipe coupling devices on the cars being brought together, and if the play between the coupling apparatus is very slight.

The device according to this invention comprises a valve-box which is secured to the coupling apparatus and in which are arranged a valve opening toward the interior of the box and a spring which serves to hold the valve on its seat. When the cars are brought together, the respective valves are pushed away from each other through the medium of rubber rings which make a hermetic joint, so that such valves are moved away from their seats and communication is established between the valve-box and the pipes secured thereto. On the cars being uncoupled, the valves are brought back to their seats by the springs even before the rubber rings are separated so that there is no loss of fluid. Such device avoids the use of any cocks.

Two embodiments of this invention are shown by way of examples in the accompanying drawings, in which:—

Figure 1:
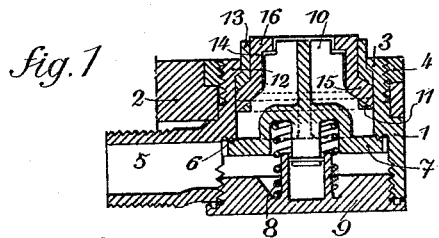
Figure 2:
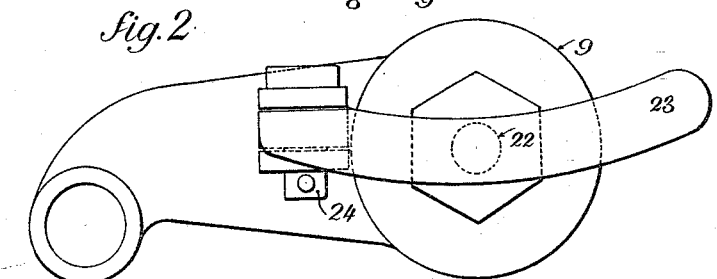
Figure 3:
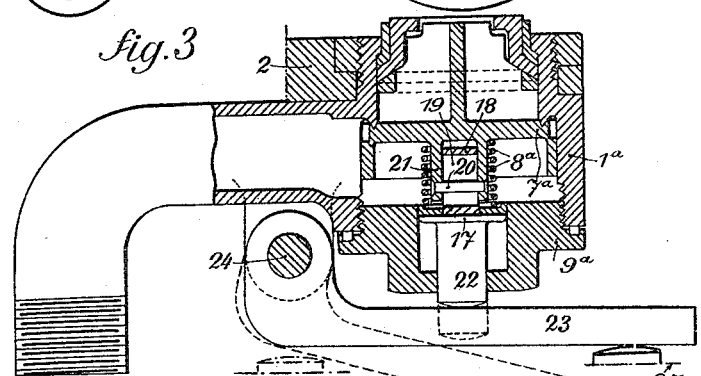
Figure 4:
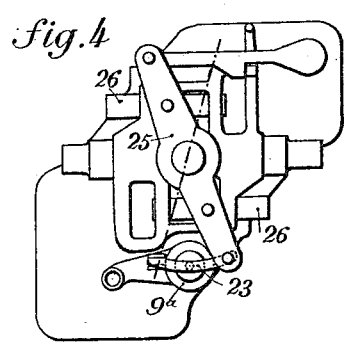
Figure 5:
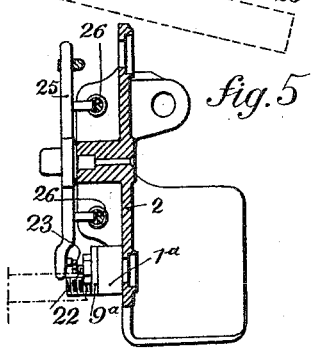

Figure 1 is a sectional view of the first embodiment. Figs. 2 and 3 are respectively an elevation and a horizontal section of the second embodiment. Fig. 4 is a diagram showing the arrangement of such second embodiment on a plate of the Boirault system coupling, seen from behind. Fig. 5 is a vertical section on the axial line of the car coupling, the view showing the valve box mounted on the car coupling device.

In Fig. 1, the valve-box 1 is open at the front face and secured on a coupling plate 2; the valve-box is located behind the latter and comprises a neck 3 which extends into an opening of the plate where it is maintained by a nut 4 located in front of such plate. The box 1 carries a lateral pipe 5 designed to be connected with an air, steam, or other similar pipe. Within the box a seat 6 is provided which is turned away from the opening in the front of the box or toward the interior of the box, against which a valve 7 is pressed by a spring 8 which bears against a closure 9 which may, as illustrated, consist of a threaded plug which takes into the box or valve casing 1.

The valve is guided in the neck 3 by wings 10 placed cross-wise and joined together by a ring 11.

At the end of the neck 3 the inner wall of the box is provided with a shoulder or flange 12 which surrounds the opening in the front of the box and serves to retain a metal ring 13, surrounding a rubber ring 14 having a peculiar contour. The inner end 15 of such rubber ring is cone-shaped; it is applied by its periphery against the inner wall of the neck 3 and is held between the inner end of the ring 13 and the ring 11 which are correspondingly cone-shaped. Again, the outer end of the ring 14 is provided with an internal annular flange 16 presenting a broad surface designed to bear against the similar flange of the coupling device of the opposite coupling apparatus. When the valve is applied to its seat, the ring 11 holds the ring 14 and the ring 13 in such a manner that the latter projects beyond the box 1 and the rubber ring projects beyond the metal ring.

When two cars are brought together, the rubber rings, which protrude somewhat beyond the metal rings 13 and the wings 10 of the valves come in contact and secure immediate air-tightness; then they compress each other until the metal rings and the wings of the valves are brought in contact with each other. During the further movement of the cars, the valves are pushed away from their seats and communication is established between the valve-boxes and the pipes connected therewith. The play behind the valves is so calculated that one of them can be pushed to the bottom of its box before the cars have come in contact with each other. Such arrangement makes the opening of both valves quite sure. When the cars separate the valves are applied on their seats under the action of the springs and the separation of the rings 14 only takes place afterward, so that there is no loss of fluid. By these means, an airtight fluid passage is secured from one neck 3 to a similar neck on an opposed coupling section before the opening of the valves, and the closure of the latter is effected before the air-tightness disappears.

This embodiment of the invention is suitable for the coupling of any gas, compressed-air, steam, or other similar fluid pipes. However, if it is applied in connection with air-brake pipes, it presents an inconveniency in that, should there be a breakage of the couplings, the simultaneous breakage of the respective coupling of the necks would have no influence on the brakes as the valves prevent any escapement of the air. The second embodiment (Figs. 2 to 4) obviate such defect. In such second embodiment, the spring 8$^a$ for closing the valve does not bear against the plug 9$^a$, but against a small piston 17 slidable in a cylindrical housing in the said plug. The inner face of the piston 17 carries a rod 18 provided with a groove 19 through which passes a pin 20 secured across a hollow projection 21 of the valve 7$^a$, so that the displacement of the piston with respect to the valve is limited in both directions. The other face of the piston carries a stem 22 which passes loosely through an opening of the plug 9$^a$ and against which a movable arm 23 is enabled to bear, such arm being pivoted at 24 to the valve-box 1$^a$. The arm 23 is so placed and shaped that it can be actuated by the double lever 25 which controls in the known manner the bolts 26 of the Boirault coupling apparatus.

While the device may be employed in connection with any suitable automatic car coupling apparatus, in the drawings it is illustrated in connection with the Boirault automatic car coupling. As shown in Fig. 5 on the inner face of the car coupling plate 2 are arranged the valve box 1, the bolts 26 and the lever 25 which controls the bolts. On the outer face are shown one of the perforated horns in which engage the bolts of another similar coupling, and one of the lugs for guiding the horns of such coupling. When the cars are brought together they are automatically coupled by the bolts of one coupling engaging the openings in the horns of the other coupling.

It is to be understood, therefore, that when two cars provided with applicant's device are brought together they are coupled automatically by the car coupling devices employed. The valve boxes are secured to the car coupling devices, and the pipes to which the air or steam pipes are connected are carried by the valve boxes. When two cars are coupled, the valve boxes of these cars are automatically brought into engagement with each other and cannot be removed away from each other as long as the car couplings are locked together.

When the lever 25 holds the bolts open, as shown in full lines in Fig. 4, it lies in front of the free end of the arm 23 and holds the latter (Fig. 3) in such a position that it pushes the piston 17 and compresses the spring 8 against the valve. If then two cars provided with the automatic coupling are coupled, the lever 25 of each coupling is unlocked in the known manner and brought yieldingly back to the position shown in dotted lines, a position in which the bolts are closed; with the result that the arm 23 is then set free by the lever 25 and is enabled to move away from the rod 22, as is also shown by the dotted lines; at the same time, the valves 7$^a$ are pushed away from each other and put the respective brake pipes in communication with one another.

As to the separation of the couplings, two cases may occur; firstly, if the couplings are uncoupled by hand in bringing the lever 25 back to the position for opening the bolts, the arm 23 pushes the piston 17 so that the spring 8$^a$ is compressed; so the valve will close when the cars are separated, without letting the air escape and hence without any operation of the brakes. Secondly, should the separation take place accidentally on account of the breakage of the coupling, the lever 25 remains in the position shown by the dotted lines, the arm 23 remains free and the spring 8$^a$ does not close the valve, so that the air escapes from the pipe and applies the brakes as soon as the cars separate. The area of the piston 17 is furthermore so determined that, when the air escapes, the pressure of the air on the piston will be greater than the difference of the air pressures on both the faces of the valve and prevents the latter from being closed by the action of the escaping air.

It must be understood that the device serving to put the valve under the dependence of the opening and closing of the automatic coupling may be varied according to the character of the latter. Broadly speaking, all that need be done is to prevent the action of the spring from closing the valve so long as the coupling members are in the coupling position, and to render to such spring its efficiency on the valve so long as the said members are in the uncoupled position; it will be easy to find for each kind of coupling mechanical connections suitable for such conditions. The coupling plate 2 in Fig. 3 is the same as in the form shown in Fig. 1 and the wing 10ª and ring 11ª are like the wing 10 ring and 11. Similarly, the elements 13, 14, 15 and 16 are the same in all respects in the form shown in Fig. 3 as in the form shown in Fig. 1.

Having thus described my invention I claim as new and desire to secure by Letters Patent:

1. The combination of a pipe coupling device comprising a valve-box having an opening in its front face and an air, steam or other pipe, a valve in the said box, a movable bearing member within the box and a closure spring compressed between the valve and such bearing member, with an operating member of an automatic coupling apparatus and means connecting the said bearing member of the valve spring with the said operating member of the automatic coupling apparatus, for the specified purpose.

2. In a railway vehicle having a coupling and a brake pipe the combination of a casing on such brake pipe, such casing having a valve chamber and a cylindrical cavity, a movable valve in such valve chamber and opening toward the interior, a movable piston in the said cylindrical cavity, a compressed spring between the valve and the piston, and means adapted to push such piston toward the valve and operatively connected with the coupling of the car for the purpose specified.

3. In a railway vehicle having a coupling and a brake pipe, such coupling having an operative member for the uncoupling of the cars, a valve casing having a valve chamber and a cylindrical cavity, such chamber communicating with the brake pipe, a movable valve in the said chamber and opening toward the interior, a piston in such cylindrical cavity, a compressed spring between the valve and the piston, and means whereby to push the said piston toward the valve and operatively connected with the operative member for the uncoupling of the cars in such a manner as to push such piston toward the valve so long as the said operating member is in the uncoupling position and to release such piston when the said operative member is in the coupling position.

In testimony, that I claim the foregoing as my invention I have signed my name in presence of two subscribing witnesses.

LOUIS BOIRAULT.

Witnesses:
ALPHONSE BOIREAUX,
MAURICE ROUX.

Copies of this patent may be obtained for five cents each, by addressing the "Commissioner of Patents, Washington, D. C."